United States Patent
Yellai et al.

(10) Patent No.: US 8,126,814 B2
(45) Date of Patent: *Feb. 28, 2012

(54) METHOD AND SYSTEM FOR INSTALLING SOFTWARE AND HARDWARE FEATURE LICENSES ON DEVICES

(75) Inventors: Prabhakara Rao Yellai, San Jose, CA (US); Mihir Maniar, Sunnyvale, CA (US); Eric B. Eggel, San Jose, CA (US); Zafar Khalid, San Jose, CA (US); Jyotsna Gummaraju, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1539 days.

This patent is subject to a terminal disclaimer.

(21) Appl. No.: 10/994,701

(22) Filed: Nov. 18, 2004

(65) Prior Publication Data

US 2006/0106728 A1    May 18, 2006

(51) Int. Cl.
    *G06F 21/00* (2006.01)
(52) U.S. Cl. ............... 705/59; 705/56; 705/57; 705/58; 726/31; 726/34
(58) Field of Classification Search .................... 705/59; 726/31, 34
See application file for complete search history.

(56) References Cited

U.S. PATENT DOCUMENTS

| | | | | |
|---|---|---|---|---|
| 5,138,712 | A | | 8/1992 | Corbin |
| 5,287,408 | A | * | 2/1994 | Samson ........................... 705/59 |
| 5,553,139 | A | * | 9/1996 | Ross et al. ...................... 705/59 |
| 5,758,069 | A | | 5/1998 | Olsen ............................... 726/27 |
| 5,940,504 | A | * | 8/1999 | Griswold ........................ 705/59 |
| 6,557,105 | B1 | * | 4/2003 | Frailong et al. ............... 713/193 |
| 6,961,858 | B2 | | 11/2005 | Fransdonk |
| 7,062,567 | B2 | | 6/2006 | Benitez et al. ................ 709/231 |
| 7,073,063 | B2 | | 7/2006 | Peinado |
| 2002/0010863 | A1 | | 1/2002 | Mankefors |
| 2003/0041243 | A1 | * | 2/2003 | Olguin et al. ................. 713/172 |
| 2003/0097655 | A1 | * | 5/2003 | Novak ............................. 725/31 |
| 2003/0181242 | A1 | | 9/2003 | Lee et al. |

OTHER PUBLICATIONS

Stolowitz Ford Cowger, Listing of Related Cases, Nov. 6, 2009.

* cited by examiner

*Primary Examiner* — Chrystina Zelaskiewicz
(74) *Attorney, Agent, or Firm* — Stolowitz Ford Cowger LLP

(57) ABSTRACT

A method and system for installing software and hardware licenses on electronic devices supporting licensable features. Specifically, a method is disclosed for installing licenses in a node based licensing scheme. The electronic device defining the node receives an input containing an authorization key. The authorization comprises a license for a service feature, a node identifier, a software version, and a sequence number. Information in the authorization key is used to install the license on the electronic device. The node identifier is compared to an official node identifier stored at the electronic device. The sequence number is compared to an official sequence number stored at the electronic device. The license is installed into a pool of licenses available to the electronic device when the node identifier matches the official node identifier and the sequence number matches the official sequence number. The sequence number ensures that the authorization key at most can only be used once.

33 Claims, 7 Drawing Sheets

METHOD AND SYSTEM FOR INSTALLING SOFTWARE AND HARDWARE FEATURE LICENSES ON DEVICES

RELATED UNITED STATES PATENT APPLICATION

This Application is related to U.S. patent application Ser. No. 10/993,634 concurrently filed with the present Application on Nov. 18, 2004, entitled "Method and System for Transferring Software and Hardware Feature Licenses Between Devices". To the extent not repeated herein, the contents of this related patent application are hereby incorporated herein by reference.

TECHNICAL FIELD

Embodiments of the present invention relate to the field of network connection management. More particularly, embodiments of the present invention relate generally to the transfer of software and hardware feature licenses between networking devices.

RELATED ART

Asynchronous Transfer Mode (ATM) technology is used as a backbone technology for some modern carrier networks. ATM supports network transmission of information including data as well as real-time voice and video. In an ATM network multiple virtual channels are used to carry multiple data streams. As a result, multiple discrete paths are dynamically created on demand through network devices (e.g., switches, routers, etc.) in an ATM switched network to carry information traffic without relying on expensive and dedicated individual physical circuits. As such, traffic is relayed across an ATM network consisting of the network devices.

Software and hardware license management for the network devices is important in maintaining good customer relations. A good licensing management scheme can help manage a growing number of licenses required for a customer that is expanding services of network devices in an ATM network. Managing the licensing of common software and hardware service features available to all the network devices allows customers to implement features based on what the customer requires both at the time of original installation and in the future.

However, one of the problems in managing licensing for network devices is that enforcement of the licenses should be as transparent to the customer as possible. This problem is more challenging in the domain of carrier class networking products (e.g., ATM switches and routers) where connectivity to the ATM network may not be available for licensing management.

One conventional license management scheme discloses a centralized license manager that communicates with each of the network devices through the communication network. However, this management scheme is inadequate in ATM networks. That is, management of the network devices does not necessarily occur over the network in an ATM network. This is especially true when the network device fails.

Another conventional license management scheme includes a card based model. Licenses are packaged onto memory on a particular card (e.g., service module). In this case, the license is dedicated to the service module and enables the associated service feature on the service module when incorporated into a network device. As such, use of the service feature is allowed only on the service module if a license is included on the service module. However, several problems exist with this card based model. In one case, when the service module fails, the replacement service model would have to have its memory programmed with the same or better licenses as originally found on the failed service module. This is unsatisfactory as suitable spares outfitted with the same licenses are cost prohibitive since duplicate licenses go unused. As such, suitable spares with the correct format of licenses are usually unavailable.

In addition, when a new licensable feature is purchased to be implemented on a network device, the new license must be programmed into the memory of the corresponding service module that is implementing the licensable feature. This usually involves the help of a technical representative to program the service module. The use of technical representatives can be time consuming for a customer who is interested in bringing the new features on-line as soon as possible. In addition, on the customer service side, this programming of licenses is an inefficient use of human resources.

BRIEF DESCRIPTION OF THE DRAWINGS

The above and other objects and advantages of the present invention will be more readily appreciated from the following detailed description when read in conjunction with the accompanying drawings, wherein.

DETAILED DESCRIPTION OF THE INVENTION

Figure 1:
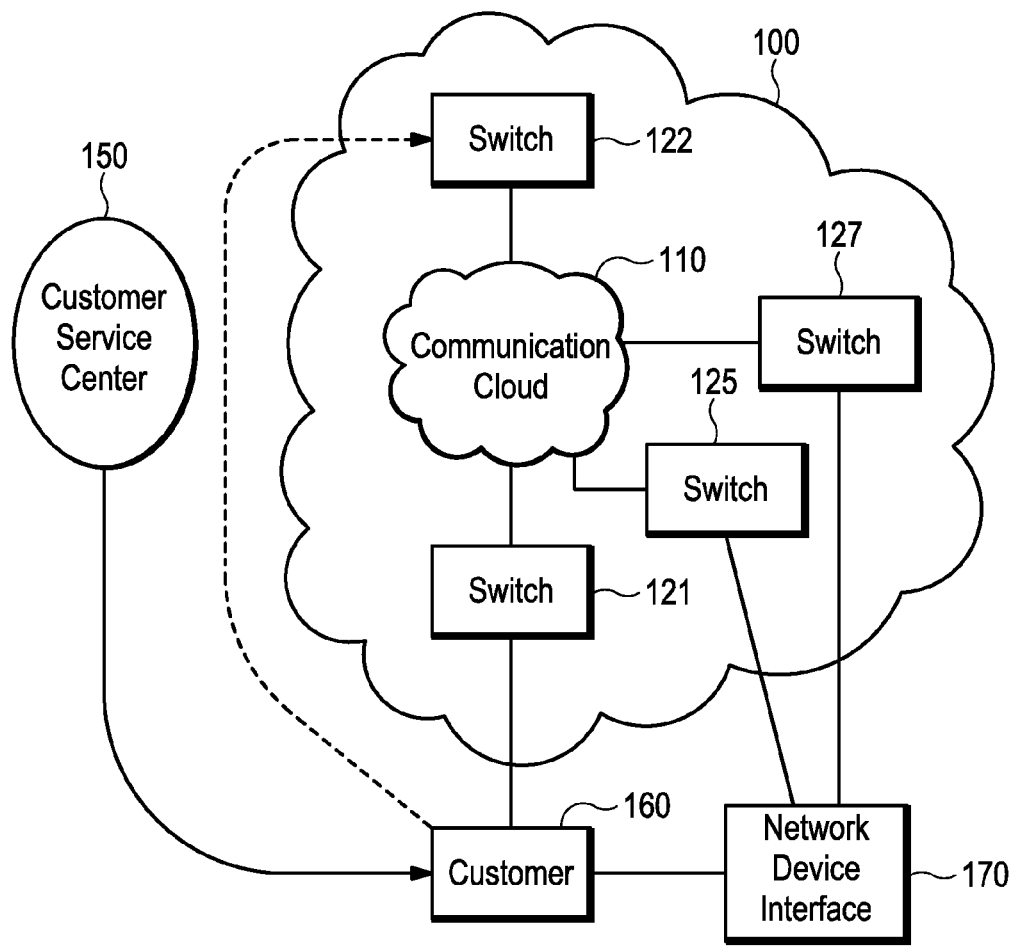
FIG. 1 is an exemplary ATM network illustrating the relationship between the customer and the customer service center when managing licenses at an electronic device supporting licensable features, upon which an embodiment of the present invention can be deployed, in accordance with one embodiment of the present invention.

Reference will now be made in detail to the preferred embodiments of the present invention, a method and system of installing licenses in a node based licensing scheme at an electronic device that is capable of supporting licensable features, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention can be implemented on software running on a computer system, for example in software contained on a computer readable medium. For instance, the computer system may be a personal computer, notebook computer, server computer, mainframe, a network device such as a switch, router, network control computer, networked computer, and the like. This software program is operable for transferring licenses between electronic devices that are capable of supporting licensable features. In one embodiment, the computer system includes a processor coupled to a bus and memory storage coupled to the bus. The memory storage can be volatile or non-volatile and can include removable storage media. The computer can also include a monitor, provision for data input and output, etc.

Some portions of the detailed description which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "comparing," "transferring," "allocating," and "presenting," "encrypting," or the like, refer to the actions and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for installing hardware and software licenses on electronic devices capable of supporting licensable features. Embodiments of the present invention provide for the management of licenses that is completely transparent to the operations of the electronic devices, since management of licenses occurs locally at the electronic device. In addition, the licensing management scheme of the present invention reduces service outages as licenses are consistently maintained at the electronic device before, during, and after device failure, as well as a failure of a network to which the electronic device is integrated. Also, the license management scheme is scalable to large numbers of electronic devices since the management of license is decentralized. Further, the license management scheme can flexibly be used to enforce varying types of software and hardware implementations, such as software features, hardware entities like ports, bandwidth, connection capacity, etc.

Embodiments of the present invention are described in terms of installing licenses on electronic devices supporting licensable features. More specifically, in some embodiments the electronic device can be any device that is capable of supporting licensable services. For example, the electronic device can be a personal computer that needs to install a license to enable the use of software features, hardware features that are located on the personal computer, or to enable certain capacity or performance parameters available on the personal computer. Other embodiments are well suited to installing licenses on electronic devices (e.g., a network device such as a network switch) that includes a chassis with multiple service modules that are plugged into slots associated with the chassis. The service module refers to a module, or card (e.g., a controller card), that offers services or features. These service modules support various licensable features that are activated with a license. These licensable features can include the forwarding of internet protocol packets, providing voice/video services, providing Asynchronous Transfer Mode/Frame Relay (ATM/FR) services, etc.

FIG. 1 is a block diagram depicting an exemplary Asynchronous Transfer Mode (ATM) network 100, in accordance with one embodiment of the present invention. ATM is a high performance, cell oriented switching and multiplexing technology that utilizes fixed-sized cells to carry different types of traffic, such as voice, video, data, etc. ATM is a connection oriented packet switching technique in which all packets are of fixed length (e.g., 53 bytes). While the present embodiment is described within the context of network devices for illustration purposes only, these network devices are illustrative of electronic devices in general that are capable of supporting licensable services, as described previously.

The ATM network 100 includes a set of ATM switches interconnected by point-to-point ATM links or interfaces. For instance, switches 121, 122, 125, and 127 can represent the start, connecting, and end point of communications through the ATM network 100, and are coupled together by the communication cloud 110. Other switches or network devices may be contained within the communication cloud 110 in the ATM network 100. For example, the switches 121, 122, 125, and 127 can be directly connected or further connected through other switches in the network 110 that facilitates ATM communication between the nodes.

A link from a switch can contain thousands of connections. In an ATM network, the connections are of varying bandwidth. Over these connections, information is transferred using ATM in an integrated manner. Switches are responsible for cell transmission and switching through the ATM network 100. For instance, switch 121 can receive an incoming connection and switches the incoming connection through switches in the ATM network 110 until reaching its destination, e.g., switch 122. Some of the services provided by the switches and network devices in the ATM network 100 are enabled through licenses.

Also included within FIG. 1 is customer 160. Customer 160 manages a set of network devices within the ATM network 100. For instance, customer 160 may manage the switches 121, 122, 125, 127, and other switches within the communication cloud 110. Management of the switches is through a direct link with each of the switches that is separate from the ATM network 100. For example, the customer may enter commands or instruction sequences (e.g., through a command line interface) directly at a switch, as indicated by dotted line connection between the customer 160 and switch 122. Also, the customer may interface with the switch through a direct communication link, as indicated by the solid line connection between the customer 160 and switch 121. In addition, the customer may enter commands and instruction sequences to various switches through network device interface 170 that is directly linked to switches 127 and 125.

In embodiments of the present invention, the customer enters commands (e.g., CLI commands) or instruction sequences for the installation of licenses on an electronic device. That is, a customer may install a license on an electronic device. For instance, in one case, customer 160 may install a license on any of the switches 121, 122, 125, and 127.

In addition, FIG. 1 includes a customer service center 150 that provides technical assistance and services for the network devices in the ATM network 100. In one embodiment, the customer service center is the originator of licenses that can be installed on network devices (e.g., switches) managed by the customer 160. For purposes of the present invention, these licenses can be installed automatically from the customer service center 150 in a manner that minimizes human intervention in the process, as will be fully described below.

Embodiments of the present invention are capable of managing and installing licenses on an electronic device capable of supporting licensable features (e.g., an ATM network device, such as a switch in FIG. 1). In one embodiment, licenses are installed on electronic devices in a node based licensing scheme. While embodiments of the present invention are disclosed within the context of an ATM network, other embodiments are well suited to other node based communication networks involving the installation and management of licenses.

Figure 2:
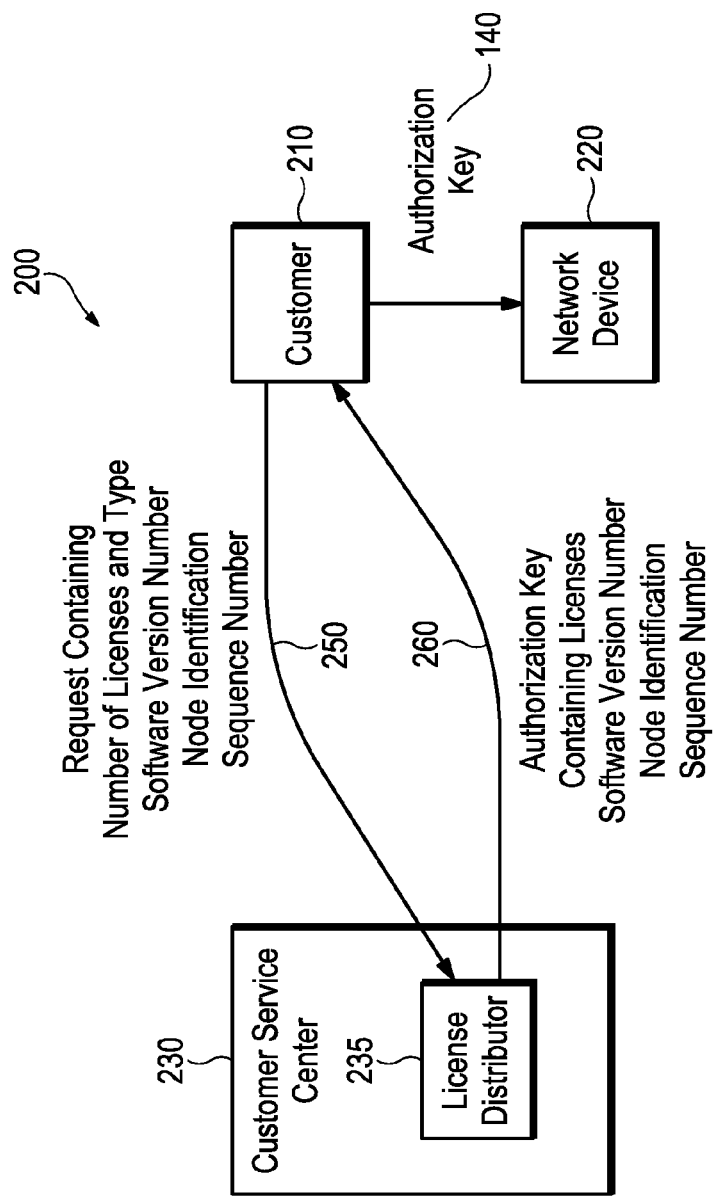
FIG. 2 is a data flow diagram illustrating the flow of information when installing licenses at an electronic device supporting licensable features, in accordance with one embodiment of the present invention.

FIG. 2 is a flow diagram illustrating the flow of information in a node based license management scheme 200 that is capable of installing licenses for service features (e.g., hardware, software, capabilities, etc.) at a node (e.g., electronic device, network device, etc.), in accordance with one embodiment of the present invention. The present embodiment enables the secure installation, transfer, and management of licenses at a network device. As a result, the present embodiment flexibly accommodates licenses for both hardware and software features that are available on a network device (e.g., bandwidth, lines/ports/connections, software applications, etc.). For illustration purposes only, the embodiment of FIG. 2 is described within the context of installing licenses on a network device. The network device is representative of any electronic device that is capable of supporting any licensable services, such as a personal computer upon which a license is installed to enable a software, hardware, or performance feature.

The network device 220 of FIG. 2 can be an ATM network device, such as a switch or router, or any other network device. The present embodiment is capable of installing licenses and managing licenses on the network device 220 even though the network device may be off-line from any network, including the ATM network. As such, the present embodiment is capable of localized installation of licenses on the network device 220 using a node based license management scheme.

For example, the customer 210 (e.g., technician) is able to interface with the network device 220 locally. That is, commands or instruction sequences are inputted directly into the network device (e.g., through a local interface or through a direct connection to the network device to enter command line interface instructions).

In general, path 250 describes the sending of an installation request from the customer to the customer service center 230 for the installation of one or more licenses. The request enables the installation of licenses originating from the customer service center on the network device 220. In one embodiment, the request is encrypted to protect the information contained within the request. The request can be transmitted through any means. For instance, the request in a digitized, bit pattern form can be transmitted over a data line, through e-mail, fax, or through a web interface managed by the customer service center 230.

The request contains identifying information that is used to restrict installation of the licenses only to the network device 220. In addition, the identifying information is able to restrict installation to a one-time procedure. That is, installation of the licenses can only occur once, and only at the network device 220. In this manner, unauthorized distribution of licenses is curtailed.

The identifying information contained within the request for installation of licenses includes the number and type of licenses requested, node identifier, software version number, and a sequence number. For example, the request can contain a request for one or more licenses that enable hardware and software features already available on the network device. That is, the network device contains service modules that each is configured with hardware and software features that are enabled via a license. These service modules are plugged into slots on the network device that communicatively couple the service modules to the system bus of the network device, for example. Some of the features are universalized and are implemented on more than one, or all, of the service modules.

As such, the request contains the number of licenses requested and the type of licenses requested. In addition, a single feature may be enabled more than once on different service modules at the node, depending on the number of licenses requested. The node identifier identifies the node, or network device 220. In one embodiment, the node identifier is a serial number associated with the chassis that forms the backbone of the network device 220. The software version number is also associated with the network device 220. The software version number indicates which version of software that controls the allocation and usage of resources that support the network device 220 (e.g., an operating system).

The sequence number is a unique number associated and dedicated to the network device 220. The number is unique only within the network device. In addition, the sequence number is used to invalidate any further installation of the requested licenses once they have been installed on the network device 220, even through a configuration save and restore operation, since the sequence number is incremented after an installation, as will be more fully described below in relation to FIG. 3.

The request is received at the customer service center. The customer service center 230 is able to install licenses that are allocatable to the customer 120. For instance, the customer service center 230 is able to install licenses that were purchased by the customer for use on network devices owned or operated by the customer 120.

At the customer service center 230, the license distributor 235 performs the functions necessary to deliver the requested licenses to the customer. For instance, as shown in FIG. 2, the license distributor 235 generates the authorization key 240 that is used to install the licenses. The license distributor 235 sends the authorization key 240 back to the customer over path 260. The authorization key 240 is transmitted back to the customer via any suitable communication means. That is, the digitized, bit pattern that encodes the authorization key 240 is transmitted to the customer (e.g., through e-mail, customer interface, fax, packaged in a storage device, etc. and sent to the customer). In addition, the authorization key 240 is encrypted to protect the information encoded within the authorization key 240.

The authorization key 240 is formatted for the software version running on the network device 220, as indicated in the original request. In addition to the software version number, the authorization key 240 contains the number and types of licenses that are authorized for installation, the node identifier to which the licenses are to be installed, and the sequence number associated with the network device 220.

After the authorization key 240 is received by the customer 120, the authorization key 240 can be directly installed or inputted into the network device. For instance, in one embodiment, the authorization key 240 is embedded within a CLI command provided to the network device 220 that instructs the network device 220 to install the licenses indicated in the authorization key 240. The licenses are then installed in a pool of licenses that is managed on the controller card of the network device 220. In this manner, local management of licenses at the network device is achieved. As such, management of licenses does not require network availability (e.g., to the customer service center 230), and as such, services provided by the network device 220 are highly available.

For example, local management of licenses ensures that service provided by the network device is minimally impacted when hardware components on the network device fail and have to be replaced. That is, after replacement of the failed components, the network device 220 is able to allocate licenses locally so that the network device can reach full service capacity in a minimal amount of time. This is because licenses are managed locally at the network device, and interfacing with the customer service center 230 or any network wide license server is unnecessary.

In addition, local management of licenses is not impacted by the size of the network (e.g., ATM network 100). As such, the management of licenses as described in the present invention is highly scalable. In addition, the localized management scheme facilitates a pay-as-you grow model for installing future licenses on network devices to meet future demands of customers.

Figure 3:
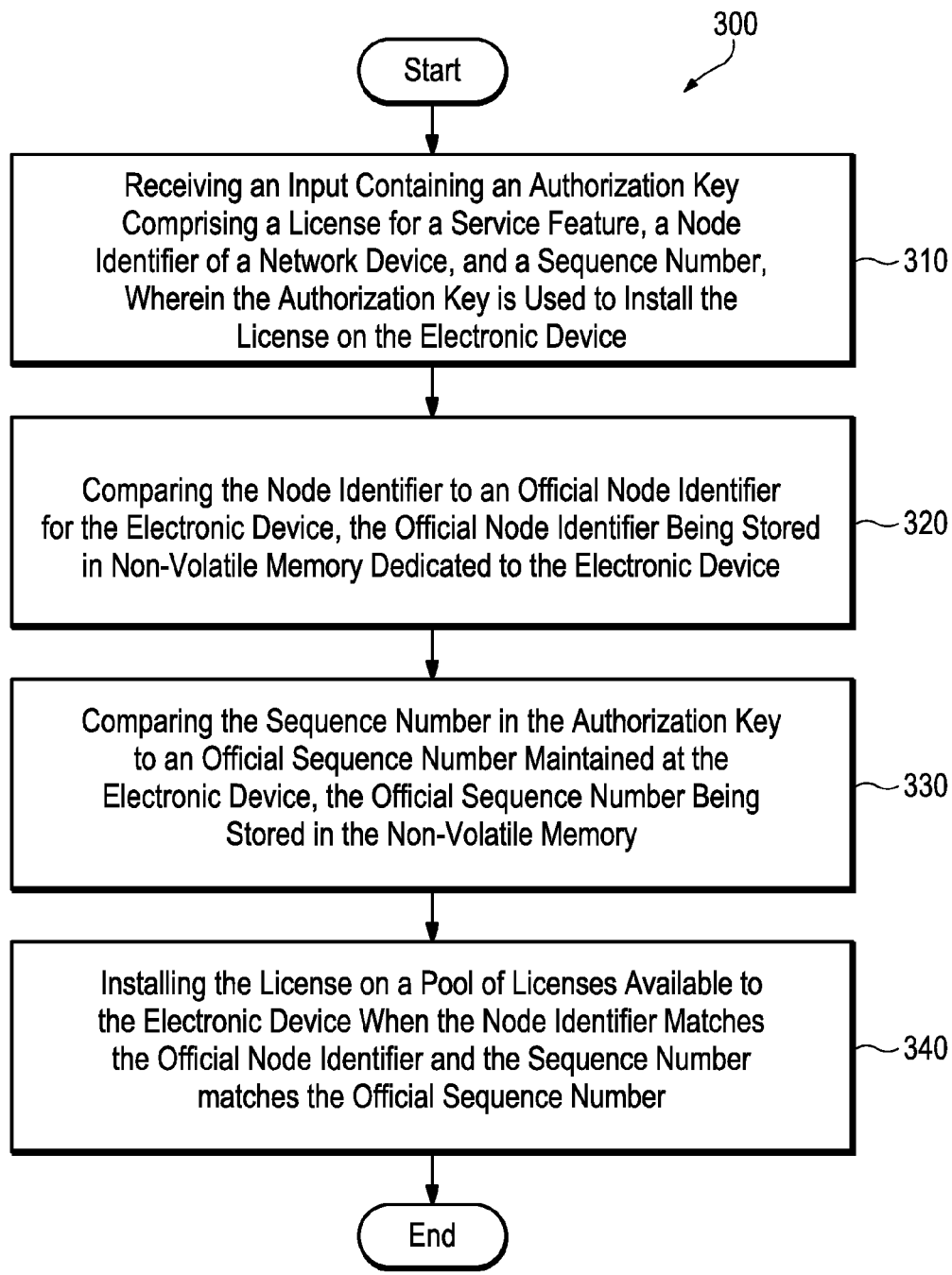
FIG. 3 is a flow diagram illustrating a computer implemented method for installing licenses in a node based licensing scheme, in accordance with one embodiment of the present invention.

FIG. 3 is a flow diagram 300 illustrating steps in a method for installing licenses on an electronic device, in accordance with one embodiment of the present invention. For instance, the method of FIG. 3 illustrates the interaction between the customer 120, the license distributor 235 and the network device 220 of FIG. 2, in one instance. In another embodiment, the method illustrated in flow diagram 300 installs licenses on an electronic device in a node based license management scheme, e.g., on a network device in an ATM network.

At 310, the present embodiment receives an input containing an authorization key. The authorization key contains information that is used during an installation sequence implemented on the electronic device to install licenses. For instance, the input can be provided directly to the electronic device (e.g., network device 220 of FIG. 2) through a command line interface at the device. That is, the authorization key, and the information contained therein, can be embedded within a CLI command or installation sequence that instructs the electronic device to install the licenses identified in the authorization key. Provided the information is correct, the CLI command or installation sequence installs the licenses provided in the authorization key onto the electronic device. If the authorization key is encrypted, the present embodiment decrypts the authorization key.

As stated previously the receipt of the authorization key is in response to a request for the license. As such, to generate the request, the official node identifier is retrieved (e.g., by the customer who manages the electronic device) from the non-volatile memory dedicated to the electronic device. In addition, the official sequence number is retrieved from the non-volatile memory dedicated to the electronic device. This information in the form of the request for the license is presented off-line from the electronic device to the license distributor (e.g., distributor 235 of FIG. 2) in an encrypted request for the installation of the licenses.

In one embodiment, the authorization key contains at least one license. That is, the authorization key is used to install one or more licenses associated with one or more service features (hardware and software) that can be implemented on the electronic device. That is, each license enables an associated service feature that is implemented on a service module installed in a slot of the electronic device.

The authorization key comprises a license for a service feature, a node identifier, and a sequence number. The authorization key also optionally includes a software version associated with the electronic device. The authorization key is used for installing the license on the electronic device. For instance, the authorization key can be embedded within a CLI command for installing licenses identified in the authorization key. The installed licenses may have been purchased from the manufacturer of the electronic device through a customer service center (e.g., center 230). That is, the customer purchases the license from the customer service center, and utilizes the method of FIG. 3 to install the license at the electronic device.

In one embodiment, the receipt of the authorization key is in direct response to a request for one or more licenses. Receipt of the authorization key occurs off-line and separate from the electronic device. The request comprises the number of licenses requested, the type of each of the licenses requested, the node identifier associated with the electronic device to which the license is installed, the software version of the electronic device, and the sequence number associated with the electronic device.

At 320, the present embodiment compares the node identifier contained in the authorization key to an official node identifier for the electronic device. The official node identifier is stored in non-volatile memory dedicated to the electronic device. For instance, the official node identifier is the serial number of the chassis that provides the backplane for service modules that support the electronic device. The service modules are plugged into slots of the chassis that communicatively couple each of the service modules to a system bus of the electronic device. The official node identifier uniquely identifies the electronic device. As such, the node identifier ensures that the license is installed at the electronic device. In addition, the official node identifier of the chassis should/may be stored in a tamper proof device to prevent duplication, in accordance with one embodiment. In another embodiment, the official node identifier is encrypted or rendered tamper proof to prevent misuse.

At 330, the present embodiment compares the sequence number in the authorization key to an official sequence number maintained at the electronic device. The official sequence number is also stored in the non-volatile memory dedicated to the electronic device. The official sequence number is used to ensure that installation of the license using the authorization key is performed once, as tied to the official sequence number. That is, once the authorization key is installed on or inputted into the electronic device, the authorization key becomes invalid, through a change in the official sequence number. Once the installation process has completed, the official sequence number is incremented to change the official sequence number. This makes the authorization key as identified by its sequence number unusable for any subsequent installation of the license on the electronic device. As such, the combination of the official node identifier and the official sequence number ensures that license installation occurs once and only at the electronic device. In one embodiment, the official sequence number should/may be stored in a tamper proof location to prevent reusing the authorization key. In another embodiment, the official sequence number is encrypted or rendered tamper proof to prevent misuse.

At 340, the present embodiment installs the license to a pool of licenses. The licenses in the pool of licenses are available to the electronic device. The installation occurs when the node identifier in the authorization key matches the official node identifier, and in combination when the sequence number matches the official sequence number. The pool of licenses is managed locally (e.g., by the controller card of the electronic device). In one embodiment, the pool of licenses is tied to the electronic device using the official node identifier.

Conversely, the present embodiment aborts the installation of the license when the node identifier in the authorization key and the official node identifier do not match. In addition, the present embodiment aborts the installation of the license when the sequence number in the authorization key and the official sequence number do not match. That is, anytime either the node identifier or the sequence number does not match their respective official versions, the installation of the licenses on the electronic device is aborted.

To provide further security, the present embodiment compares the software version contained in the authorization key to the official software version number of the electronic device. The official software version number is embedded into the software itself and is or may not be stored in a non-volatile memory dedicated to the electronic device. If the software version number in the authorization key matches the official software version number of the electronic device, then the present embodiment installs the license to the pool of licenses. However, if the software version number in the authorization key does not match the official software version number of the electronic device, then the installation is aborted. In one embodiment, the official software version is used to select the secret key that decrypts the authorization key. That is, the secret key used to decrypt the authorization key is selected based on the official software version of the electronic device. Previously, the authorization key was encrypted using the same or a corresponding secret key that is also based on the official software version of the electronic device provided in the request.

More specifically, in one embodiment, the license is allocated to a particular slot on the electronic device. The license enables a service feature associated with the license on any service module installed (e.g., plugged in) in that slot. For instance, in one embodiment, the controller card manages the pool of licenses. The controller card allocates licenses in the pool of licenses to the slots in the electronic device. Any service module that is installed, or plugged, into that slot can enable the associated service feature corresponding to the license. The service module is plugged into one or more slots in the electronic device to communicatively couple the service module to the system bus of the electronic device in order to utilize the service features. As a result, a localized, node based licensing scheme is implemented. For instance, local management of licenses is provided on the controller card of an electronic device. Localized management of licenses provides for less reliance on a centralized license management scheme that manages licenses for the electronic device. In this manner, the electronic device can provide services much more quickly since a centralized license manager is not required for installation of licenses.

For instance, when a software application on the service module, or on the controller card, requires the software or hardware features associated with the license, the license gets allocated from the pool of licenses to the slot upon which the service module is installed in the chassis. In another embodiment, the license is allocated to slot upon which the controller card is installed. This enables a service feature associated with the license on the controller card.

As a result, since licenses are allocated to slots, if a service module or controller card utilizing a service feature corresponding to a license fails, a replacement service module with the same enabled service feature can be installed into the same slot without reconfiguring licenses on the replacement service module. In these cases, the license is not tied to the controller card or the service module, but to the slot.

In another embodiment, licenses are deallocated from the slot when the service module, to include a controller card, no longer needs the license. That is, when the service feature is no longer being used on the service module of a particular slot to which the license is allocated, the license can be de-allocated from that slot. In this case, the license is returned to the pool of licenses, and the license is again available for allocation to any of slots on the chassis of the electronic device.

Figure 4:
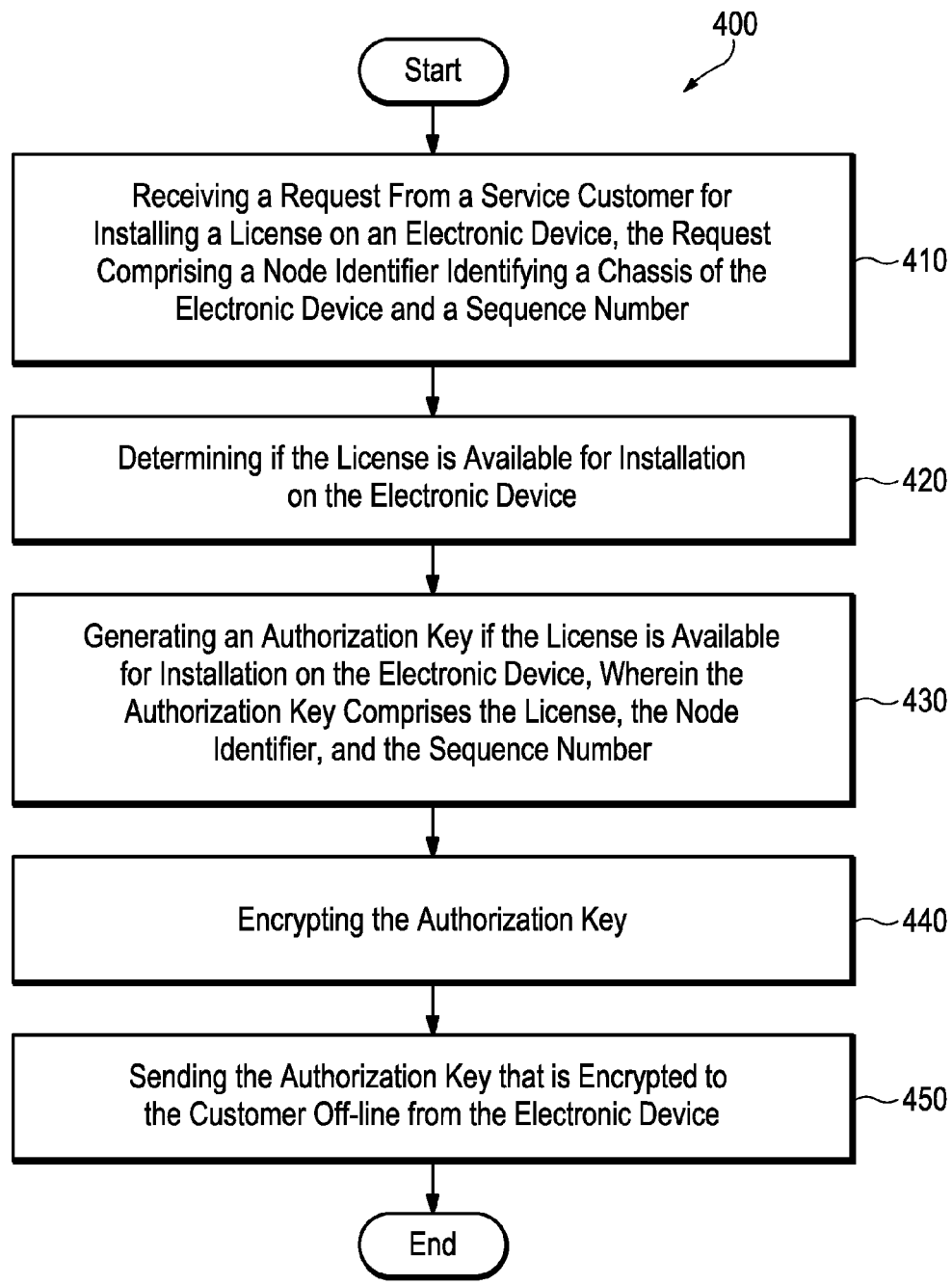
FIG. 4 is a flow diagram illustrating a computer implemented method for generating an authorization key that is used for installing licenses in a node based licensing scheme, in accordance with one embodiment of the present invention.
Figure 5:
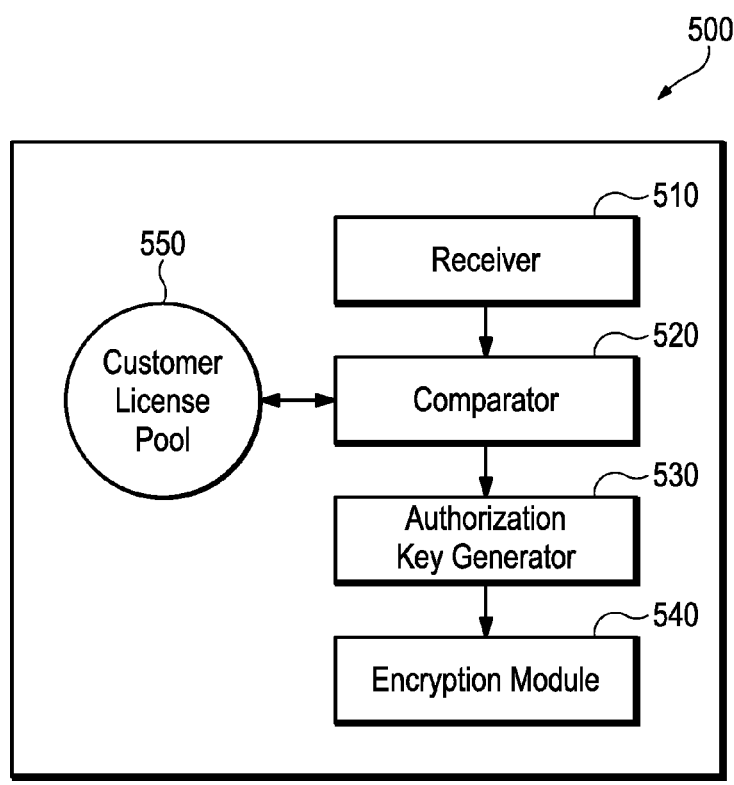
FIG. 5 is a block diagram of a license distributor that is capable of generating an authorization key that is used for installing licenses in a node based licensing scheme, in accordance with one embodiment of the present invention.

FIGS. 4 and 5 combined illustrate steps in a method for node-based management of licenses. FIG. 4 is a flow diagram illustrating steps in a method for off-line installation of licenses on an electronic device, in accordance with one embodiment of the present invention. That is, the present embodiment is capable of installing licenses on an electronic device even though the electronic device is not connected to any network. FIG. 5 is a block diagram 500 of a license distributor 235 of FIG. 2 used to install licenses on an electronic device.

At 410, the present embodiment receives a request from a customer for installing a license at an electronic device. For instance, the request is received at the license distributor 235 by the receiver 510. The customer owns or manages the electronic device (e.g., an ATM network device). As described previously, the request comprises a node identifier identifying a chassis backbone of the electronic device and a sequence number associated with the electronic device. To protect the sensitive contents of the request, the request may be encrypted. Since the request is transmitted off-line and separate from the electronic device, the request may be received over any suitable communication path (e.g., web interface to a license distributor, fax, e-mail, etc.).

At 420, the present embodiment determines if the license is available to the customer for installation on the electronic device. That is, the customer is requesting one or more licenses to be installed on an electronic device. Those licenses that are previously assigned to the customer can be installed on the electronic device. For example, the customer may have purchased the license and is now installing the licenses on the electronic device. However, requests for licenses that are not purchased nor assigned to the customer cannot be installed on the electronic device.

In one case, the present embodiment compares the requested licenses to a list or pool of licenses that are available to the customer. For example, the comparator 520 compares the licenses in the request to available licenses in a customer license pool 550. These available licenses may have been purchased by the customer, for example. The present embodiment maintains the pool of licenses 550 available to the customer. As such, the present embodiment determines if the license is included within the pool of licenses 550 through the comparator 520.

At 430, the present embodiment generates an authorization key if the license is available to the customer. For instance, the authorization key is generated in the generator 530. The authorization key comprises the license, the node identifier as presented in the request, and the sequence number as presented in the request, as previously described. Optionally, the software version of the electronic device is also included. Using the node identifier and the sequence number, the authorization key is limited to installation of licenses once and only at the electronic device identified by the node identifier.

At 440, the present embodiment encrypts the authorization key. For example, encryption is performed in the encryption module 540. In this manner, information in the authorization key (e.g., the sequence number and the serial number) can be protected. After encryption, the present embodiment sends the authorization key to the customer 450.

Figure 6:
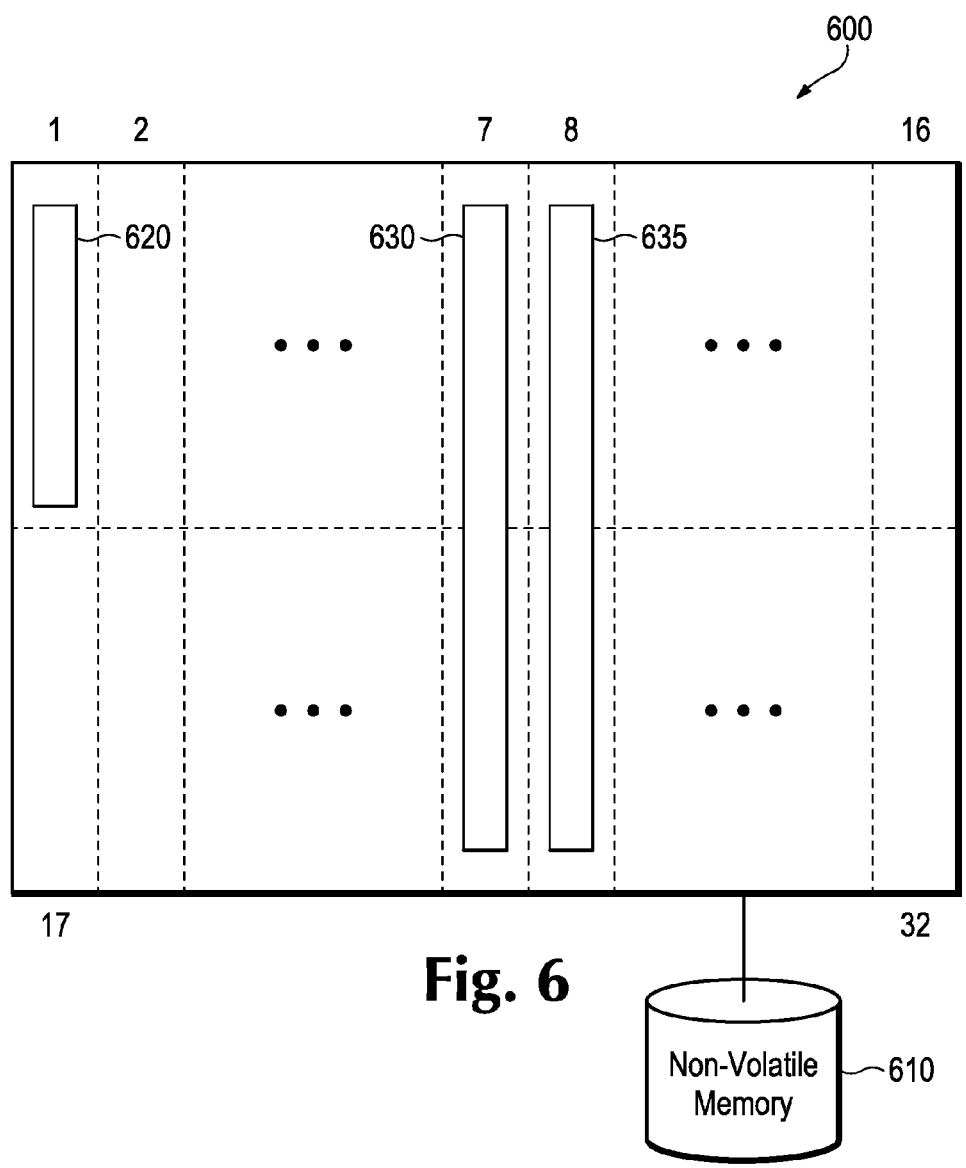
FIG. 6 is a block diagram of a chassis for a network device that is capable of locally managing and installing licenses in a node based licensing scheme, in accordance with one embodiment of the present invention.

FIG. 6 is a block diagram of an electronic device 600 which is capable of managing licenses locally for the local installation of license on the electronic device 600, in accordance with one embodiment of the present invention. The electronic device 600 is capable of supporting features that are activated through licenses. The electronic device is a network device, such as a switch, in embodiments of the present invention. The electronic device 600 is capable of off-line installation of licenses.

The electronic device 600 includes a chassis of a backplane that supports the electronic device. In one embodiment, the electronic device is a node in an associated ATM, or any other, network. In addition, the electronic device 600 comprises a non-volatile memory 610, a plurality of service modules that are plugged into slots (e.g., 1-32) of the chassis backplane. The service models (e.g., module 620) provide hardware, software and performance features that are enabled with licenses, for instance.

The non-volatile memory 610 is dedicated to the chassis backplane of the electronic device. That is, the chassis comes equipped with the non-volatile memory 610 and is dedicated to the chassis, and integrated into the chassis. In one embodiment, the non-volatile memory is tamper proof.

In one embodiment, the non-volatile memory stores an official sequence number and an official node identifier for the electronic device. As described previously, the official node identifier may define the electronic device. In one embodiment, the node identifier is the serial number of the chassis backplane associated with the electronic device. The official sequence number is maintained at the non-volatile memory 610 to ensure that installation of licenses correspond to requests for the installation of those licenses that contain the same sequence number, as previously described.

As shown in FIG. 6, the controller modules 630 and 635 are identical, and perform identically. The controller modules 630 and 635 are coupled to the non-volatile memory 610. One controller module is used for backup purposes. One of the functions of the controller modules 630 and 635 is to manage the pool of licenses that is available to the electronic device 600. As such, the active controller module (630 or 635) receives the authorization key (e.g., embedded within a CLI command to install licenses) that includes authorization to install a license for a service feature, a node identifier associated with a node to which the license is installed, and a sequence number associated with the node to which the license is being installed. In one embodiment, the authorization key is formatted to a software version of the electronic device, as described previously.

Figure 7:
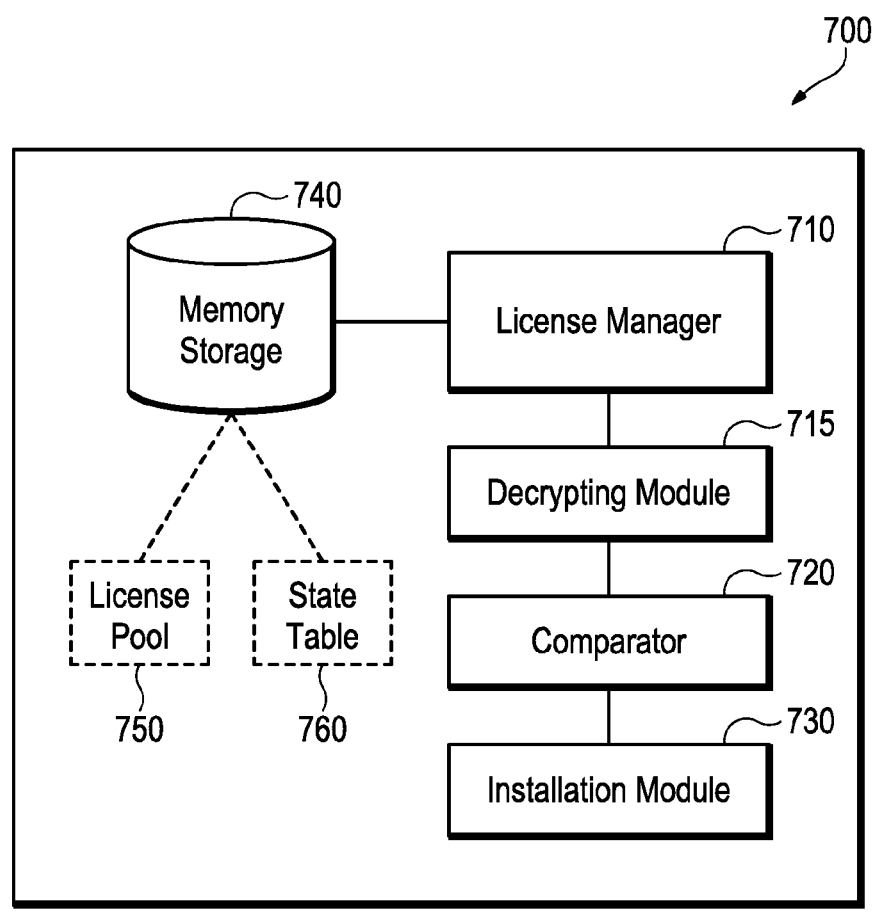
FIG. 7 is a block diagram of a controller that is capable of installing licenses at a network device in a node based licensing scheme, in accordance with one embodiment of the present invention.

FIG. 7 is a block diagram of a controller module 700 (e.g., controller module 630 or 635 of FIG. 6), in accordance with one embodiment of the present invention. The controller module 700 comprises a license manager 710, a comparator 720, an installation module 730, a memory storage 740, a license pool 750, and a state table 760.

The license manager 710 manages a pool of licenses 750 available to an associated electronic device (e.g., device 600 of FIG. 6). The license manager is capable of allocating licenses to slots in a chassis of an electronic device. The allocated licenses enable corresponding service features on any service module installed in those slots.

Localized, node based management of the licenses is implemented through a license pool 750 and a state table 760 that is contained within memory storage 740 dedicated to the controller module 700. The memory storage 740 can be a hard disk drive, or non-volatile memory, or any other suitable combination of memory types. As stated previously, the license pool 750 contains licenses for service features that are allocatable to various slots within the electronic device.

In one embodiment, the license pool is managed locally by the license manager 710 using a state table 760. To illustrate an exemplary state table 760, Table 1 provides the information contained in the state table 760. The state table 760 stores states of licenses in the pool of licenses 750. The columns in Table 1 define the license type (e.g., "License Type"), the quantity of installed licenses available for the electronic device (e.g., "Installed Quantity"), and the number of licenses of that type that are allocated (e.g., "Allocated Quantity"). For instance, one type of license may provide a feature on the electronic device that enables multiplexing, channelization, etc.

TABLE 1

| State Table of FIG. 7 | | |
|---|---|---|
| License Type | Installed Quantity | Allocated Quantity |
| Type A | 4 | 2 |
| Type B | 2 | 0 |
| Type C | 1 | 1 |
| Type D | 5 | 0 |

In addition, the license manager can create a configuration of the licenses used in the electronic device. The configuration is stored in the memory storage 740. The configuration lists the allocation of licenses to slots within the electronic device.

In one embodiment, the license manager 710 receives an authorization key within an instruction sequence or CLI command as an input for the installation of licenses to the license pool 750. The information within the authorization key is encrypted, and decrypted using decrypting module 715. A secret key is selected based on the official software version used by the electronic device is used by the decrypting module 715 to decrypt the authorization key. As stated previously, the authorization key contains information that is used to restrict installation of licenses on an identified electronic device through a node identifier. Also, the authorization key can only be used only once, as regulated by a sequence number.

The comparator 720 compares the node identifier contained in an authorization key that is used to install licenses to an official node identifier for the electronic device. As described previously, the official node identifier is stored in the non-volatile memory (e.g., 610 of FIG. 6) dedicated to the node electronic device. The comparator 720 also compares the sequence number in the authorization key to an official sequence number stored at the non-volatile memory.

In addition, the installation module 730 is used to install the license into the pool of licenses 750 available to the electronic device when the node identifier and the sequence number in the authorization key match their respective official versions.

In another embodiment, licenses can be installed using service modules, or cards. For example, a manufacturer programs ordered licenses onto the non-volatile memory dedicated to a service module. This service module only is used as a medium or vehicle for installing the licenses in a scalable manner. These licenses cannot be used while on the service module used for installation.

When the service module is inserted into a chassis of an electronic device (e.g., using a manual command line interface instruction), these licenses are installed into the license pool managed by the controller card in the chassis. The movement of licenses from the service module to the pool of licenses is unidirectional. That is, licenses can not be moved back from the pool of licenses back to the service module used for installation. Upon installation, the licenses in the pool of licenses are marked, such that the licenses can only be installed on the electronic device once.

In another embodiment, the movement of licenses is bi-directional. That is, licenses can be moved back from the pool of licenses back to the service module that is used for installation of licenses on electronic devices. In this case, after movement of a license from the pool of licenses, that license is no longer available for allocation on the electronic device associated with the pool of licenses. In addition, to help prevent misuse of licenses, the sequence number associated with the electronic device is incremented upon movement of a license from the pool of licenses to the service module that is used for installation of licenses on electronic devices.

In still another embodiment, to help achieve scalable installation of new licenses in an entire network, a centralized license controller can be used. This centralized license controller is communicatively coupled to each of the electronic devices (e.g., network devices) in the network. The centralized license controller can obtain license keys for the entire network and install them on each electronic device in the network. Management of the licenses still occurs on the local node, i.e., the electronic device itself.

In other embodiments, if there is any situation in which a license shortage, or mismatch, or inconsistency is detected, and enforcing the corresponding license or licenses could deleteriously cause service impact, the chassis/slot will be put into an alarm condition for a grace period. During the grace period, a technical representative can be called to audit and validate the situation. A variety of actions can be taken that motivate the customer to remedy the alarm condition after the grace period ends.

In another embodiment, during a chassis swap procedure a grace period is allowed to enable invalid licenses on a new chassis of an electronic device to be used for a period of time, in accordance with one embodiment of the present invention. The new chassis is replacing an old chassis that has failed, for example. In this way, the grace period prevents additional service outages. The grace period is equally applicable when licenses on an old chassis are restored to a new chassis that is replacing the old chassis.

Ordinarily, licenses are tied to the electronic device. In the present embodiment, when the old chassis is replaced with a new chassis, the new chassis will allow the licenses previously installed on the old chassis to operate on the new chassis. That is, service features associated with the licenses previously installed on the old chassis can be used on the new chassis for a grace period, even though the licenses have not been officially transferred to the new chassis.

Instead of rendering the new chassis useless because of the lack of valid licenses, the new chassis is put into an alarm condition for a grace period. The grace period can be for an arbitrary period of time (hours, days, weeks, etc.), and is not necessarily based on a calendar date or time. The amount of time associated with the grace period can be embedded into the license keys installed on the chassis (e.g., in the nonvolatile memory 610 of FIG. 6) so that it can be different for different customers, chassis, products, etc.

During the grace period, the customer can contact the necessary representative (e.g., representative providing technical assistance, or the customer service center 150 of FIG. 1) to disarm the alarm condition. For instance, the representative can validate the situation to ensure that the alarm is genuine. Further, the representative can issue new licenses that transfers ownership of the license pool (e.g., in the controller card 700 of FIG. 7) from the old chassis to the new chassis.

A variety of actions can be taken once the grace period expires. For instance, the new chassis can be made non-operational. Also, in another case, only additions of connections are blocked after the grace period, so that the license management scheme doesn't cause any service outage.

In another embodiment, a grace period is established during a configuration save and restore operation, in accordance with one embodiment. For example, in one situation, the customer may save the chassis configuration and then archive it. The customer then may transfer or install some of the licenses to another electronic device. Thereafter, the customer restores the previously saved configuration back onto the original electronic device. The present embodiment is able to detect the configuration save and restore operation using the sequence number on the chassis backplane. That is the sequence numbers will not match.

The chassis is again put into an alarm condition for a grace period. During the grace period, the customer should involve a technical assistance representative, for example, to recover the chassis from this alarm condition. The technical representative can, for example, evaluate the situation, generate the appropriate license keys (e.g., install or transfer keys) and install them on the original chassis.

Accordingly, various embodiments of the present invention disclose a method and system for installing licenses in an electronic device in a localized license management scheme. Embodiments of the present invention provide for the prevention of unauthorized use of a license, for example multiple uses of a single license. In addition, localized management of licenses at an electronic device as disclosed by embodiments of the present invention facilitate a pay-as-you grow model for installing future licenses on an electronic device. In addition, embodiments of the present invention prevent the unauthorized use of service features without an accompanying license.

While the methods of embodiments illustrated in flow diagrams 300 and 400 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for installing licenses in an electronic device in a localized, node based license management scheme are described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A method, comprising:
   sending a request for a service feature license from an electronic device to a license distributor, wherein said request includes an official node identifier that uniquely identifies the electronic device and an official sequence number of the electronic device that is utilized to prevent multiple installations of the requested service feature license by the electronic device;
   receiving an authorization key from the license distributor in response to the request, wherein the authorization key includes the service feature license associated with the request, a node identifier that identifies which device is allowed to install the license, and a sequence number;
   comparing said node identifier in said authorization key to said official node identifier stored by said electronic device;
   comparing said sequence number in said authorization key to said official sequence number sent to the license distributor in the request and that is also maintained at said electronic device;
   installing said service feature license in a pool of licenses on said electronic device when said node identifier matches said official node identifier and said sequence number matches said official sequence number; and
   preventing the installation of more than one copy of said service feature license on said electronic device by incrementing said official sequence number, after installation of said license, so that said authorization key cannot be used to install the service feature license again on said electronic device.

2. The method of claim 1, further comprising:
   retrieving said official node identifier from a non-volatile memory;
   retrieving said official sequence number from said non-volatile memory; and
   presenting, off-line from said electronic device, said official node identifier and said official sequence number to the license distributor in an encrypted request for installing said service feature license, wherein said electronic device is a network device, wherein said service feature license enables a service feature of a service module integrated with said electronic device, and wherein said service feature includes software, hardware, bandwidth, or combinations thereof.

3. The method of claim 1, further comprising:
   allocating said service feature license to a slot of a chassis within said electronic device to enable a service feature associated with said license on a service module installed in said service slot, wherein said slot is adapted to receive said service module, and wherein said service module is configured to be replaced without re-allocating said license.

4. The method of claim 3, further comprising:
   deallocating said service feature license from said slot to disable said service feature on said service module, wherein said license is available for re-allocation in said electronic device.

5. The method of claim 1, wherein said official node identifier comprises a serial number for a chassis backplane of said electronic device.

6. The method of claim 1, wherein said authorization key is encrypted and said method further comprises:
   decrypting said authorization key.

7. The method of claim 1, wherein said authorization key further comprises another license for another service feature that is available for said electronic device.

8. The method of claim 1, further comprising;
   managing said license pool in a state table, wherein said state table comprises a total number of licenses for each service feature available on said electronic device, and the number of activated licenses for each service feature available on said electronic device.

9. The method of claim 1, further comprising:
   aborting installation of said service feature license when said node identifier in said authorization key and said official node identifier do not match; and
   aborting installation of said service feature license when said sequence number in said authorization key and said official sequence number do not match.

10. The method of claim 1, wherein said authorization key further comprises a software version number to which said authorization key is formatted, said method further comprising:
    comparing said software version number in said authorization key to an official software version number of said electronic device; and
    installing said service feature license into said pool of licenses when said software version number matches said official software version number.

11. The method of claim 1, wherein said electronic device is a network device.

12. The method of claim 1, further comprising:
    invoking an alarm state in said electronic device when any license inconsistency is detected in said pool of licenses; and
    allowing operation of said electronic device for a grace period after said alarm state is invoked.

13. The method of claim 12, further comprising:
    after expiration of said grace period, if said license inconsistency has not been resolved, continuing to allow basic services on said electronic device.

14. An electronic device, comprising:
    a non-volatile memory dedicated to a chassis of said electronic device, said non-volatile memory storing an official sequence number and an official node identifier for said electronic device, wherein said official node identifier is configured to uniquely identify said electronic device;
    a controller module programmed to receive an authorization key generated by a license distributor in response to the license distributor receiving a request for a license for a service feature from said electronic device, wherein the request includes the official node identifier and the official sequence number, and wherein the authorization key includes the license for the service feature, a node identifier corresponding to the official node identifier in the request, and a sequence number corresponding to the official sequence number in the request, said controller module further comprising:

a license manager in said controller module programmed to manage a pool of licenses available to said electronic device;

a comparator programmed to compare said node identifier in said authorization key to said official node identifier stored in said non-volatile memory, and programmed to compare said sequence number in said authorization key to said official sequence number stored in said non-volatile memory; and an installation module programmed to install said license in a pool of licenses available to said electronic device when said node identifier matches said official node identifier and said sequence number matches said official sequence number, wherein said installation module is programmed to increment said official sequence number and is programmed to store said official sequence number in said non-volatile memory to prevent the installation module from installing another copy of said license on said electronic device.

15. The device of claim 14, further comprising: said non-volatile memory is tamper proof.

16. The electronic device of claim 14, further comprising:
a service module that provides a service feature associated with said license, wherein said service module is installed in a slot to which said license is allocated, wherein said slot is included in a chassis within said electronic device, and wherein said service module is configured to be replaced without re-allocating said license.

17. The electronic device of claim 14, wherein said license manager is programmed to allocate said license to a slot of a chassis within said electronic device to enable a service feature associated with said license on any service module installed in said slot, and wherein said service module is programmed to be replaced without re-allocating said license.

18. The electronic device of claim 17, further comprising: a state table storing states of licenses in said pool of licenses, wherein said state table is managed by said license manager, and wherein said state table comprises a total number of licenses for service features available to said electronic device, and the number of activated licenses on said electronic device.

19. The electronic device of claim 14, further comprising:
a software version implemented on said electronic device, wherein said authorization key is formatted to said software version.

20. The electronic device of claim 14, further comprising: a decryptor programmed to decrypt said authorization key that is encrypted.

21. The electronic device of claim 20, wherein said electronic device is a network device, and wherein said license is received off-line from a network, wherein off-line is non-network.

22. The electronic device of claim 21, wherein said network device is a switch.

23. A computer readable memory including executable instructions which, when executed in a processing system, causes the processing system to perform operations comprising:
sending a request for a license for a service feature from an electronic device to a license distributor, wherein said request includes an official node identifier that uniquely identifies the electronic device and an official sequence number of the electronic device that is utilized to prevent multiple installations of the requested service feature license by the electronic device;

receiving an authorization key from the license distributor in response to the request, wherein the authorization key includes the service feature license associated with the request, a node identifier that identifies which device is allowed to install the license, and a sequence number;

comparing said node identifier in said authorization key to said official node identifier stored by said electronic device;

comparing said sequence number in said authorization key to said official sequence number sent to the license distributor in the request and that is also maintained at said electronic device;

installing said license into a pool of licenses available to said electronic device when said node identifier matches said official node identifier and said sequence number matches said official sequence number; and preventing the installation of more than one copy of said license on said electronic device by incrementing said official sequence number, after installation of said license.

24. The computer readable memory of claim 23, wherein said operations further comprises:
allocating said license to a slot of a chassis within said electronic device to enable a service feature associated with said license on any service module installed in said slot, wherein said slot is adapted to receive said service module, and wherein said service module is configured to be replaced without re-allocating said license.

25. The computer readable memory of claim 24, wherein said operations further comprises:
deallocating said license from said slot to disable said service feature on said any service module, wherein said license is available for re-allocation in said electronic device.

26. The method of claim 1, wherein said request is encrypted, wherein said license enables a service feature of a service module integrated with said electronic device, and wherein said service feature includes a bandwidth parameter.

27. The method of claim 2, wherein said service feature includes a bandwidth parameter.

28. The computer readable memory of claim 23, wherein said operations further comprises:
retrieving said official node identifier from said non-volatile memory;
retrieving said official sequence number from said non-volatile memory; and
presenting off-line from said electronic device said official node identifier and said official sequence number to the license distributor in an encrypted request for installing said license, wherein said electronic device is a network device, wherein said license enables a service feature of a service module integrated with said electronic device, and wherein said service feature includes software, hardware, bandwidth, or combinations thereof.

29. The computer readable memory of claim 28, wherein said service feature includes a bandwidth parameter.

30. A method, comprising:
receiving, with a license distributor, a request from an electronic device for installing to install a license on said electronic device, said request comprising a node identifier identifying a chassis of said electronic device and a sequence number stored by said electronic device;
generating, with the license distributor, an authorization key when said license is available to said electronic device, wherein said authorization key comprises said license, said node identifier as presented in said request, and said sequence number as presented in said request, wherein said sequence number prevents the installation of more than one copy of said license on said electronic device;

encrypting said authorization key with the license distributor; and sending said encrypted authorization key to said electronic device from the license distributor, wherein said electronic device is configured to install the license when the node identifier in the authorization key matches an official node identifier stored by the electronic device and when the sequence number in the authorization key matches an official sequence number stored by the electronic device, and after said electronic device installs the license, said electronic device is configured to increment the official sequence number stored by the electronic device.

31. The method of claim 30, wherein said receiving a request further comprises:

receiving said request off-line from said electronic device.

32. The method of claim 30, further comprises:

maintaining a pool of licenses available to said electronic device; and determining if said license is included in said pool of licenses.

33. The method of claim 30, further comprising:

formatting said authorization key according to a software version running said electronic device, wherein said software version is included within said request.

\* \* \* \* \*